US005683143A

United States Patent [19]

Peterson et al.

[11] Patent Number: 5,683,143

[45] Date of Patent: Nov. 4, 1997

[54] ABRASIVE SURFACE TREATMENT APPARATUS HAVING REMOVABLE BLOCKS

[75] Inventors: Clayton R. Peterson, Bigfork, Mont.; Gordon E. Pearlman, Los Angeles, Calif.

[73] Assignee: Pearl Abrasive Company, City of Commerce, Calif.

[21] Appl. No.: 584,956

[22] Filed: Jan. 11, 1996

[51] Int. Cl.[6] .............................. B23D 79/10; B24B 7/18

[52] U.S. Cl. ......................... 299/41.1; 299/102; 451/353; 451/548

[58] Field of Search .................................... 299/41.1, 102, 299/104, 109; 451/353, 359, 548

[56] References Cited

U.S. PATENT DOCUMENTS

| | | | |
|---|---|---|---|
| 2,793,476 | 5/1957 | Lombardo | 451/353 |
| 2,923,107 | 2/1960 | Biasoni | 451/353 |
| 3,102,372 | 9/1963 | Vezner | 451/353 |
| 3,452,486 | 7/1969 | Lombardo et al. | 451/353 |
| 3,701,221 | 10/1972 | Vinella | 451/353 |
| 4,385,412 | 5/1983 | Neufeldt | 15/236.1 |
| 4,610,112 | 9/1986 | Kelsey | 451/430 |
| 4,668,017 | 5/1987 | Peterson et al. | 299/41.1 |
| 4,758,050 | 7/1988 | Peterson et al. | 299/41.1 |
| 4,965,965 | 10/1990 | Wallin et al. | 451/159 |
| 5,081,734 | 1/1992 | Sandford et al. | 451/353 X |

FOREIGN PATENT DOCUMENTS

| | | | |
|---|---|---|---|
| 313345 | 7/1919 | Germany | 451/353 |

OTHER PUBLICATIONS

General Equipment Company Advertisement for Scrap-e-R-Tach Industrial Floor Coatings Removal System for the SG24 Series Surface Grinder (1 page) (undated).

General Equipment Company Advertisement for SG24/E Surface Grinder (2 pages) (undated).

*Primary Examiner*—David J. Bagnell

*Attorney, Agent, or Firm*—Sheppard, Mullin, Richter & Hampton

[57] ABSTRACT

An improved abrasive floor treatment apparatus that can be used to effectively treat a variety of floor surfaces, including floor surfaces that are uneven. The apparatus includes a plurality of special abrasive block assemblies that are mounted on the underside of one or more rotatable disks, with each such assembly including a mounting block that releasably retains a plurality of spring-biased abrader assemblies. Multiple configurations for these abrader assemblies are provided, each adapted for use in providing a different kind of surface treatment, and these abrader assemblies are easily and conveniently installed in the mounting block.

17 Claims, 3 Drawing Sheets

ABRASIVE SURFACE TREATMENT APPARATUS HAVING REMOVABLE BLOCKS

BACKGROUND OF THE INVENTION

This invention relates generally to abrasive surface treatment apparatus and, more particularly, to abrasive surface treatment apparatus having different sets of removable abrasive blocks.

Apparatus of this particular kind are commonly used in the abrasive treatment of floor surfaces, including for example the breaking up and removal of deposits of grease, dirt, and various industrial residues, the cleaning of concrete, asphalt, tiles and aggregate slabs, and the buffing and polishing of terrazzo, marble and granite floor surfaces. A typical apparatus of this kind includes two rotatable disks mounted on the bottom of its front portion, with each disk having three abrasive blocks mounted to its underside, for engaging the floor surface to be treated. An electric motor rotates the two disks in counter-rotating directions, while an operator moves the apparatus across the floor with the assistance of a pair of rear wheels.

The underside of each rotatable disk includes a separate receptacle for receiving each of the three abrasive blocks, and these blocks customarily are retained rigidly in place using a simple wooden wedge. Each abrasive block has the general shape of an elongated rectangular box, with its downwardly facing side incorporating an abrasive material. Several different kinds of abrasive blocks are normally provided for each apparatus, and each kind of block is adapted for a particular kind of surface treatment. Examples of these different kinds of abrasive blocks include a simple grinding stone, a tubular block coated with carbide grit, a scarifier, a wire brush, and a carbide scraper. When a different kind of surface treatment is desired, the operator removes the existing abrasive blocks and installs in their place the abrasive blocks adapted to provide the desired new treatment.

Although the surface treatment apparatus described briefly above have functioned generally satisfactorily in treating a wide variety of floor surfaces, they are believed to have been subject to several deficiencies. One deficiency is that the abrasive blocks are retained in place rigidly. This rigidity can hamper an efficient treatment of some floor surfaces, particularly floor surfaces that are uneven. It also can hamper an efficient treatment of floor surfaces when the separate blocks have different amounts of wear, because those blocks will project downwardly from the rotatable disks by different, uneven amounts. Another deficiency is that multiple sets abrasive blocks are ordinarily provided for each apparatus, requiring an undue amount of storage space.

It should, therefore, be appreciated that there is a need for an improved abrasive floor surface treatment apparatus of the kind that includes a plurality of blocks on the underside of one or more rotatable disks, which can function effectively even on floor surfaces that are uneven and which can function effectively even if the blocks' floor treatment surfaces have different amounts of wear. It should also be appreciated that there is a need for an improved floor surface treatment apparatus of this kind that does not require the storage of multiple sets of abrasive blocks, each incorporating a different kind of abrasive material. The present invention fulfills these needs.

SUMMARY OF THE INVENTION

The present invention is embodied in an improved apparatus for abrasively treating a floor surface, and a mounting block assembly that is part of such an apparatus, which can function with improved effectiveness even on floor surfaces that are uneven. The apparatus includes a rotatable disk having a plurality of receptacles on its underside, each sized to receive and retain a separate abrasive block assembly. Each abrasive block assembly includes a mounting block having a plurality of downwardly facing recesses and further includes a plurality of abrader assemblies, each sized and configured to be received and releasably retained in a separate recess. Each abrader assembly includes a movable pin configured to be movable longitudinally in the recess, between a retracted position and an extended position, and further configured to incorporate an abrasive material at its downwardly facing end. Each abrader assembly further includes a spring that biases the movable pin to its extended position.

In use, with the plurality of mounting blocks installed in the receptacles of the rotatable disk, and with each mounting block carrying a plurality of abrader assemblies, the apparatus rests on the floor surface with a portion of its weight being borne by the abrader assemblies. Rotation of the rotatable disk moves the abrasive material of the abrader assemblies across the floor surface, to treat the surface in the desired fashion. The spring bias provided in each of the abrader assemblies ensures that a uniform treatment of the floor surface is provided even though the surface might be uneven.

In a more detailed feature of the invention, a second plurality of abrader assemblies is included, similar to the first plurality of abrader assemblies, except that each incorporates an abrasive material of a second kind at its downwardly facing end. This second plurality of abrader assemblies can be selectively substituted for the first plurality of abrader assemblies, such that the apparatus is adapted to provide a different treatment of the floor surface. This selective substitution can be accomplished without the need to remove the mounting blocks from their receptacles on the underside of the rotatable disk.

In another more detailed feature of the invention, each abrader assembly further includes a generally cylindrical sleeve that is conformably received in a separate recess of a mounting block. The movable pin of the abrader assembly is, in turn, conformably received in a central bore of the sleeve. The mounting block can have the general shape of an elongated rectangular box, and the mounting block further includes clamping means for releasably clamping the sleeves of a plurality of abrader assemblies in their corresponding mounting block recesses. In one form of the invention, the mounting block can have a longitudinal slot that extends lengthwise along the block, through the plurality of recesses, and the clamping means takes the form of a screw that spans the slot, such that tightening of the screw reduces the width of the slot and thereby clamps the sleeves of the abrader assemblies in their corresponding mounting block recesses.

Other features and advantages of the present invention should become apparent from the following description of the preferred embodiments, taken in conjunction with the accompanying drawings, which illustrate, by way of example, the principles of the invention.

DESCRIPTION OF THE PREFERRED EMBODIMENTS

Figure 2:
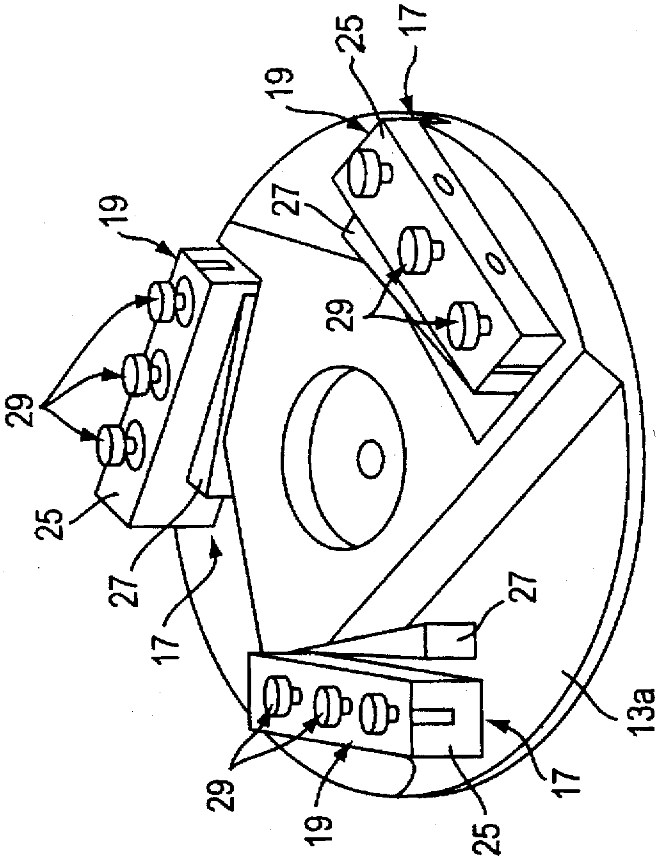
FIG. 2 is a perspective view of the underside of a rotatable disk that can be mounted at the bottom of the abrasive floor treatment apparatus of FIG. 1, the depicted disk carrying three abrasive block assemblies embodying the invention.
Figure 1:
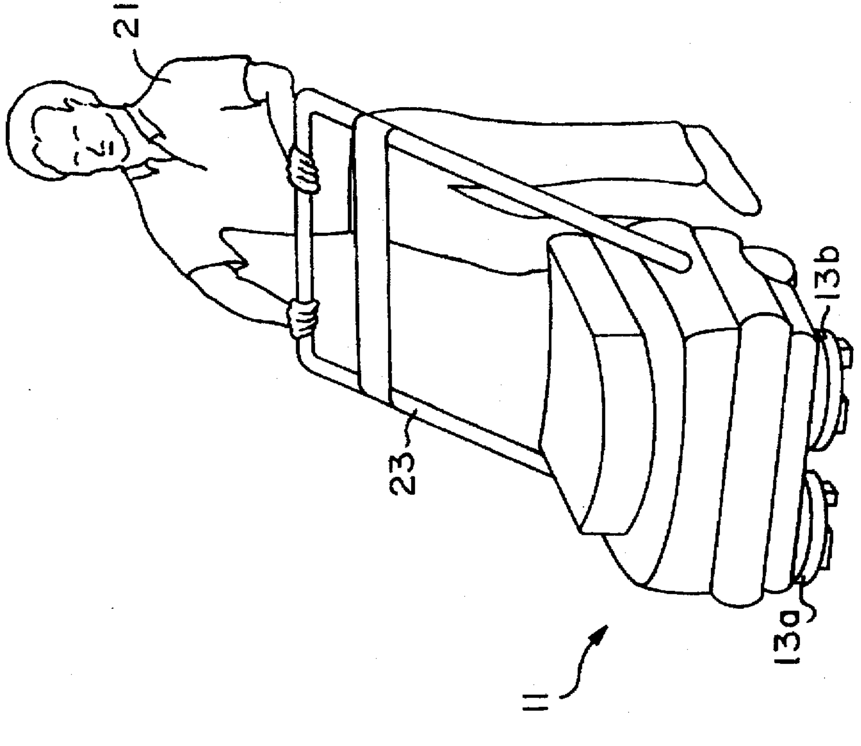
FIG. 1 is a perspective view of an abrasive floor treatment apparatus in accordance with the invention, being moved by an operator across a floor surface.

With reference now to the drawings, and particularly to FIG. 1, there is shown an abrasive floor treatment apparatus 11 in accordance with the invention, incorporating two counter-rotating disks 13*a* and 13*b* at the bottom of its front portion, for use in abrading or otherwise treating a floor surface 15. As shown in FIG. 2, the underside of the disk 13*a* includes three receptacles 17 spaced uniformly around the disk's periphery and configured to receive and releasably retain three abrasive block assemblies 19, which are configured to engage and treat the floor surface. In use, the apparatus is supported by the abrasive block assemblies mounted on the two rotatable disks and by two wheels mounted at the bottom of its rear portion. An operator 21 manually moves the apparatus across the floor surface using a control handle 25, while the disks are rotated, to abrade or otherwise treat the surface.

Each abrasive block assembly 19 includes a steel mounting block 23 having the general shape of an elongated rectangular box, and the disk receptacle 17 that receives and releasably retains the mounting block has the shape of a closed-end channel of slightly wider dimension. A wooden wedge 27 is inserted into the narrow gap between the mounting block and the receptacle's side wall, to secure the block rigidly in place. Other customary means of retaining the mounting block could alternatively be used.

Each mounting block 25 is configured to receive and releasably retain up to three abrader assemblies 29 on its bottom side. These abrader assemblies engage the floor surface 15 and abrade or otherwise treat the surface as the disks 13*a* and 13*b* are rotated. Several different kinds of abrader assemblies are provided, each adapted to treat the floor surface in a particular manner. In addition, the abrader assemblies are individually replaceable in the mounting block, so that the apparatus 11 can quickly and conveniently be adapted for each desired use.

Figure 3:
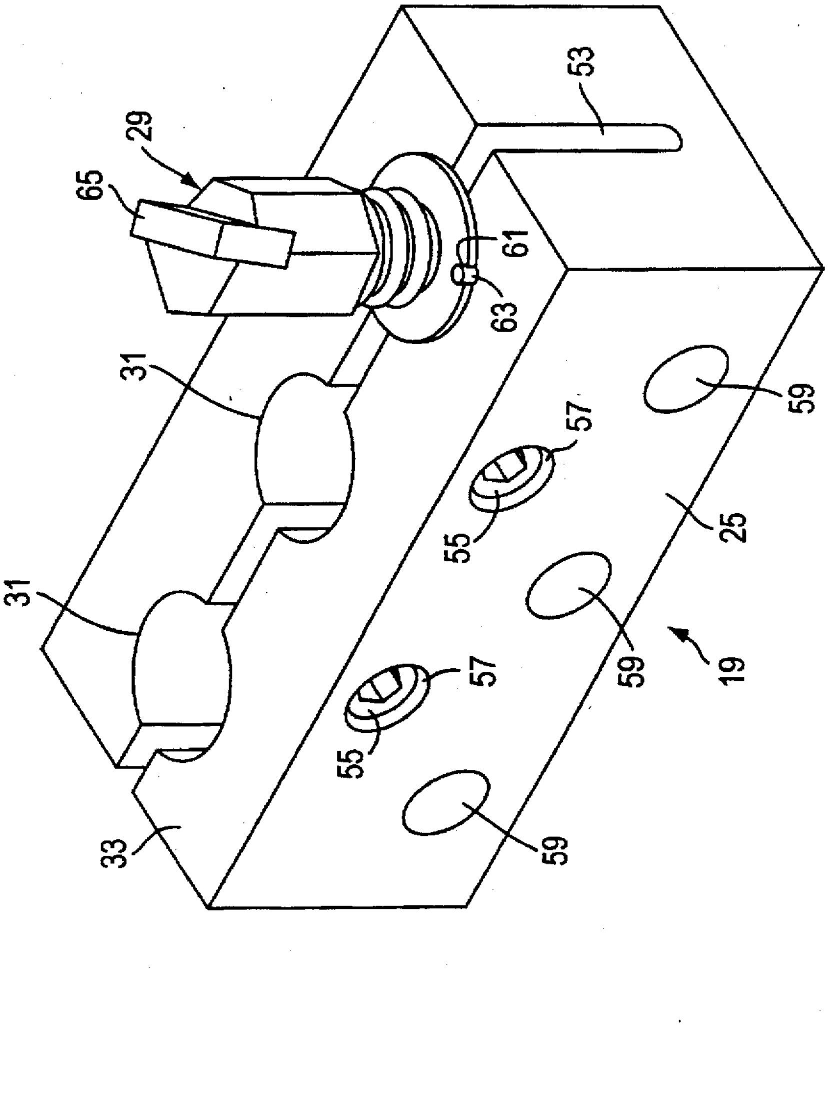
FIG. 3 is a perspective view of the underside of an abrasive block assembly in accordance with the invention, suitable for mounting on the rotatable disk of FIG. 2, the abrasive block assembly being shown with just one of three abrasive pins installed in a mounting block.

The abrasive block assembly 19 will now be described, with reference to FIGS. 3 and 4. The assembly's mounting block 25 includes three cylindrical bores, or recesses 31 that extend completely through the block, from its bottom surface 33 to its top surface. These recesses are evenly spaced along the block's length, and a separate abrader assembly 29 can be installed into each such recess.

Figure 4:
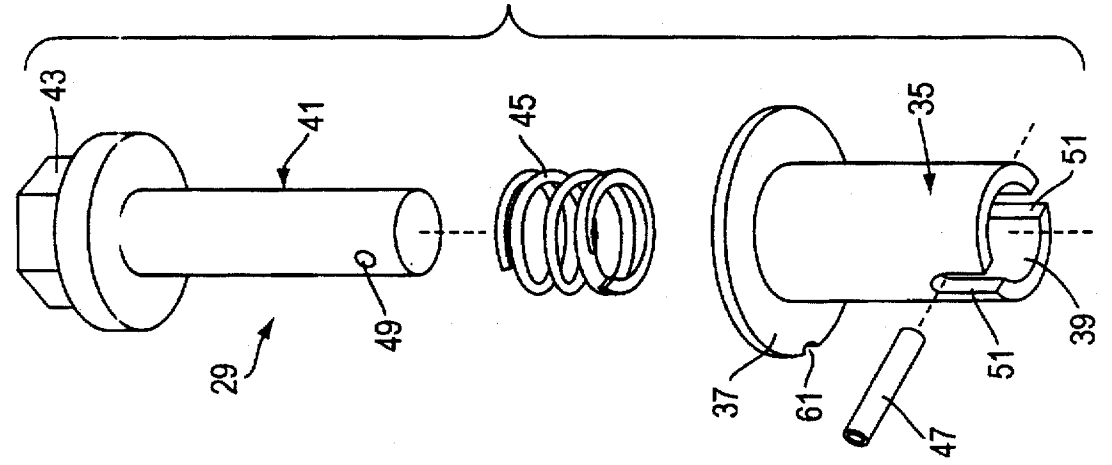
FIG. 4 is an exploded perspective view of one abrader assembly that can be installed in the mounting block.

With particular reference to FIG. 4, each abrader assembly 29 includes a sleeve 35 sized to fit conformably in a separate recess 31 on the underside of the mounting block 25. A flange 37 controls the depth at which the sleeve is seated. A central bore 39 of the sleeve is sized to conformably receive the shaft of a pin 41 that includes an enlarged head 43 at its lower end, which incorporates an abrasive material. A coil spring 45 is disposed between the sleeve's flange and the pin's enlarged head, to bias the pin downwardly, away from the sleeve. To restrain the pin 41 from being forced completely out of the sleeve by the spring, a roll pin 47 extends through a laterally extending hole 49 formed at the upper end of the pin 41, to be received in slots 51 formed at the upper end of the sleeve 35.

The sleeves 35 of the abrader assemblies 29 are releasably clamped in the recesses 31 of the mounting block 25. This is accomplished using a slot 53 that extends into the block's bottom surface 33, along the entire length of the block and through the centers of the three recesses 31. Two screws 55 span the slot 53, with their threaded shafts (not shown) engaging threaded bores (not shown) formed in the mounting block on one side of the slot, and with their heads seated in counter-sunk holes 57 formed in the mounting block on the other side of the slot. Tightening the screws reduces the size of the slot, to clamp the sleeves in place.

The mounting block 25 further includes three through-holes 59 extending laterally through it, from one side wall to another, in alignment with the three recesses 31. These holes allow access to the roll pins 47 of any abrader assemblies 29 that are installed in the mounting block, so that the abrader assemblies can be assembled and disassembled while their sleeves 35 remain clamped in place. This facilitates a rapid substitution of a pin 41 incorporating one kind of abrasive material for a pin incorporating another kind of abrasive material.

To ensure that the roll pin 47 of each installed abrader assembly 29 is properly aligned with its corresponding through-hole 59 formed in the mounting block 25, the sleeve 35 is configured so that its slot 51 automatically aligns with the through-hole. This is achieved by providing the sleeve flange 37 with a cutout 61 that is engageable with a protrusion or pin 63 projecting from a specific location on the mounting block's bottom surface 33.

The spring bias of the pins 41 of the abrader assemblies 29 facilitates the use of the floor treatment apparatus 11 even on floor surfaces 15 that are uneven. Abrader assemblies that encounter any high points or lips on the floor surface will accommodate those high points or lips simply by compressing their coil springs 45 by an additional amount. The remaining abrader assemblies will maintain their contact with the floor surface and continue to treat that surface.

Figure 5:
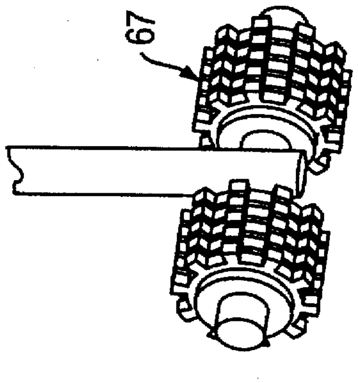
FIG. 5 is a perspective view of an alternative pin for an abrader assembly, which functions as a scarifier.

As mentioned above, several different abrader assemblies 29 incorporating different kinds of abrasive materials or structures for treating floor surfaces 15 are provided. In each case, it is the head portion of the assembly's pin 41 that incorporates the abrasive material or structure. For example, FIG. 3 depicts an abrader assembly that incorporates a carbide scraper 65 into the head 43 of its pin 41. FIG. 4 depicts an abrader assembly that incorporates a diamond grit material into the head 43' of its pin 41'. FIG. 5 depicts an abrader assembly that incorporates a scarifier 67 into the head of its pin 43". This scarifier incorporates a plurality of independent rotatable washers having star-like projections.

Figure 7:
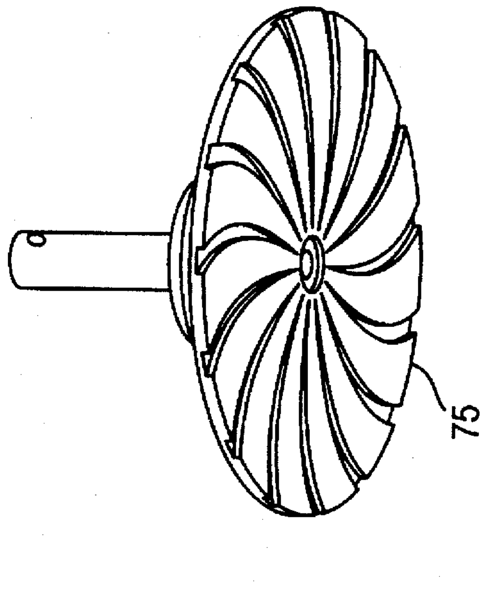
FIG. 7 is a perspective view of yet another pin for an abrader assembly, which includes a grinding wheel threadedly secured to a threaded pin head like that of FIG. 6.
Figure 6:
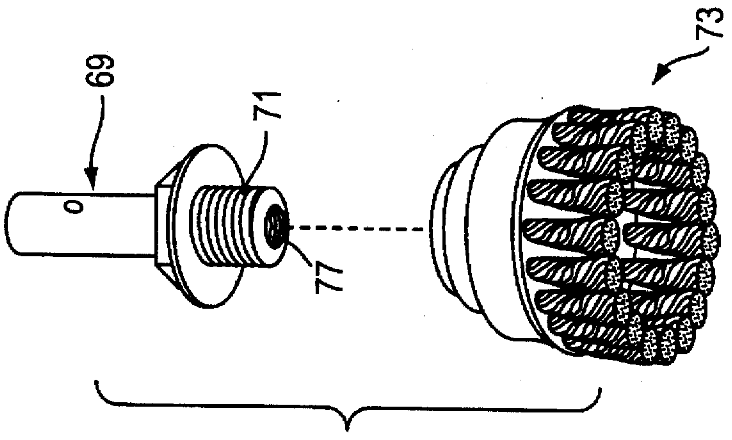
FIG. 6 is an exploded perspective view of another pin for an abrader assembly, which includes an externally threaded head to which can be attached a wire brush.

FIG. 6 depicts a special-purpose pin 69 having an enlarged, externally threaded head 71 that threadedly receives any of several different abrasive structures. Examples of such abrasive structures include a wire brush 73 (FIG. 6) and a grinding wheel 75 (FIG. 7). These latter structures incorporate threaded bores that thread onto the pin's threaded head. In addition, a screw (not shown) can be used to engage a threaded bore 77 formed in the pin's threaded head 71 (FIG. 6), to ensure that the structure will not unintentionally loosen while the apparatus 11 is in use.

Many of the abrasive structures like the wire brush 73 and the grinding wheel 75 are of the kind that, in normal use, are rotated about their central axes. In this application, however, where they are installed on a mounting block 25, such rotation is restrained. In addition, such structures ordinarily are substantially larger in size that the heads 43 of pins 41 like those of FIGS. 3 and 4. Consequently, only one or two of such structures ordinarily can be installed into each mounting block.

It should be appreciated from the foregoing description that the present invention provides an improved abrasive floor treatment apparatus that can be used to effectively treat a variety of floor surfaces, including floor surfaces that are uneven. The apparatus includes a plurality of special abrasive block assemblies that are mounted on the underside of one or more rotatable disks, with each such assembly including a mounting block that releasably retains a plurality of spring-biased abrader assemblies. Multiple configurations for these abrader assemblies are provided, each adapted for use in providing a different kind of surface treatment, and these abrader assemblies are easily and conveniently installed in the mounting block.

Although the invention has been described in detail with reference only to the preferred embodiments, those skilled in the art will appreciate that various modifications can be made without departing from the invention. Accordingly, the invention is defined only by the following claims.

We claim:

1. Apparatus for abrasively treating a floor surface, comprising:

a rotatable disk having a plurality of receptacles on its underside;

a plurality of mounting blocks, each mounting block being sized and configured to be received and retained in one of the disk receptacles, and each mounting block including a plurality of downwardly facing recesses; and a first plurality of abrader assemblies, each abrader assembly being sized and configured to be received and releasably retained in a separate recess of the plurality of mounting blocks, and each abrader assembly including a movable pin configured to be movable longitudinally in the recess, between a retracted position and an extended position, the movable pin incorporating an abrasive material of a first kind at its downwardly facing end, and a spring that biases the movable pin to its extended position;

wherein, in use, the apparatus rests on the floor surface with at least a portion of its weight being borne by the first plurality of abraders assemblies, and wherein rotation of the rotatable disk moves the abrasive material of the abrader assemblies across the floor surface, to treat the surface.

2. Apparatus as defined in claim 1, wherein:

each of the first plurality of abrader assemblies further includes a sleeve sized to fit conformably in a separate mounting block recess, the sleeve having a central bore sized to conformably receive the movable pin of the abrader assembly;

each of the plurality of mounting blocks has the general shape of an elongated rectangular box; and each of the plurality of mounting blocks includes clamping means for releasably clamping the sleeves of a plurality of abrader assemblies in their corresponding mounting block recesses.

3. Apparatus as defined in claim 2, wherein:

each of the plurality of mounting blocks further includes a longitudinal slot that extends lengthwise along the block, through the plurality of recesses; and the clamping means of each of the plurality of mounting blocks includes a screw that spans the slot, such that tightening of the screw reduces the width of the slot and thereby clamps the sleeves of the plurality of abrader assemblies in their corresponding mounting block recesses.

4. Apparatus as defined in claim 2, wherein:

each of the first plurality of abrader assemblies further includes a cross pin that extends laterally through the upper end of the movable pin, to restrain the spring from moving the movable pin beyond its extended position; and each of the plurality of mounting blocks includes a plurality of apertures that provide access to the cross pins of the associated abrader assemblies.

5. Apparatus as defined in claim 1, wherein the movable pin of each of the first plurality of abrader assemblies is integrated as a single component.

6. Apparatus as defined in claim 1, wherein:

each of the first plurality of abrader assemblies further includes a sleeve sized to fit conformably in a separate mounting block recess, the sleeve having a central bore sized to conformably receive the movable pin of the abrader assembly; and the movable pin of each of the first plurality of abrader assemblies includes a shaft that is sized to fit conformably in the bore of the corresponding sleeve and to be movable longitudinally therein, between the retracted position and the extended position, and a disk secured to the downwardly facing end of the shaft and incorporating the abrasive material of the first kind into its downwardly facing end.

7. Apparatus as defined in claim 1, wherein:

each of the first plurality of abrader assemblies further includes a sleeve sized to fit conformably in a separate mounting block recess, the sleeve having a central bore sized to conformably receive the movable pin of the first abrader assembly;

the apparatus further includes a second plurality of abrader assemblies, each of the second plurality of abrader assemblies including a movable pin that is sized to fit in a sleeve bore of one of the first plurality of abrader assemblies and to be movable longitudinally therein, between a retracted position and an extended position;

each of the movable pins of the second plurality of abrader assemblies incorporates an abrasive material of a second kind, different from the abrasive material of the first kind, at its downwardly facing end; and the movable pins of the second plurality of abrader assemblies can be selectively substituted for the movable pins of the first plurality of abrader assemblies, such that the apparatus is adapted to provide a different treatment of the floor surface.

8. Apparatus as defined in claim 1, wherein:

the apparatus further includes a second plurality of abrader assemblies, each of the second plurality of abrader assemblies including a movable pin configured to be movable longitudinally in a separate mounting block recess, between a retracted position and an extended position, and a spring that biases the movable pin to its extended position;

each of the movable pins of the second plurality of abrader assemblies incorporates an abrasive material of a second kind, different from the abrasive material of the first kind, at its downwardly facing end; and the second plurality of abrader assemblies can be selectively substituted for the first plurality of abrader assemblies, such that the apparatus is adapted to provide a different treatment of the floor surface.

9. An abrasive block assembly for use in a floor surface treatment apparatus of a kind that includes a rotatable disk having a plurality of receptacles on its underside, the abrasive block assembly comprising:

a mounting block sized and configured to be received and retained in a receptacle on the underside of a rotatable disk of a floor surface treatment apparatus, wherein the mounting block includes a plurality of downwardly facing recesses; and a first plurality of abrader assemblies, each abrader assembly being sized and configured to be received and releasably retained in a separate recess of the mounting block, and each abrader assembly including a movable pin configured to be movable longitudinally in the recess, between a retracted position and an extended position, the movable pin incorporating an abrasive material of a first kind at its downwardly facing end, and a spring that biases the movable pin to its extended position.

10. An abrasive block assembly as defined in claim 9, wherein:

each of the first plurality of abrader assemblies further includes a sleeve sized to fit conformably in a separate recess of the mounting block, the sleeve having a central bore sized to conformably receive the movable pin of the abrader assembly;

the mounting block has the general shape of an elongated rectangular box; and the mounting block includes clamping means for releasably clamping the sleeves of a plurality of abrader assemblies in their corresponding mounting block recesses.

11. An abrasive block assembly as defined in claim 10, wherein:

the mounting block further includes a longitudinal slot that extends along its length, through the plurality of recesses; and the clamping means includes a screw that spans the slot, such that tightening of the screw reduces the width of the slot and thereby clamps the sleeves of the plurality of abrader assemblies in their corresponding mounting block recesses.

12. An abrasive block assembly as defined in claim 10, wherein:

each of the first plurality of abrader assemblies further includes a cross pin that extends laterally through the upper end of the movable pin, to restrain the spring from moving the movable pin beyond its extended position; and the mounting block includes a plurality of apertures that provide access to the cross pins of the associated abrader assemblies.

13. An abrasive block assembly as defined in claim 9, wherein the movable pin of each of the first plurality of abrader assemblies is integrated as a single component.

14. An abrasive block assembly as defined in claim 9, wherein:

each of the first plurality of abrader assemblies further includes a sleeve sized to fit conformably in a separate recess of the mounting block, the sleeve having a central bore sized to conformably receive the movable pin of the abrader assembly; and the movable pin of each of the first plurality of abrader assemblies includes a shaft that is sized to fit conformably in the bore of the corresponding sleeve and to be movable longitudinally therein, between the retracted position and the extended position, and a disk secured to the downwardly facing end of the shaft and incorporating the abrasive material of the first kind into its downwardly facing surface.

15. An abrasive block assembly as defined in claim 9, wherein:

each of the first plurality of abrader assemblies further includes a sleeve sized to fit conformably in a separate recess of the mounting block, the sleeve having a central bore sized to conformably receive the movable pin of the first abrader assembly;

the abrasive block assembly further includes a second plurality of abrader assemblies, each of the second plurality of abrader assemblies including a movable pin that is sized to fit in a sleeve bore of one of the first plurality of abrader assemblies and to be movable longitudinally therein, between a retracted position and an extended position;

each of the movable pins of the second plurality of abrader assemblies incorporates an abrasive material of a second kind, different from the abrasive material of the first kind, at its downwardly facing end; and the movable pins of the second plurality of abrader assemblies can be selectively substituted for the movable pins of the first plurality of abrader assemblies.

16. An abrasive block assembly as defined in claim 9, wherein:

the abrasive block assembly further includes a second plurality of abrader assemblies, each of the second plurality of abrader assemblies including a movable pin configured to be movable longitudinally in a mounting block recess, between a retracted position and an extended position, and a spring that biases the movable pin to its extended position;

each of the movable pins of the second plurality of abrader assemblies incorporates an abrasive material of a second kind, different from the abrasive material of the first kind, at its downwardly facing end; and the second plurality of abrader assemblies can be selectively substituted for the first plurality of abrader assemblies.

17. An abrasive block assembly for use in a floor surface treatment apparatus of a kind that includes a rotatable disk having a plurality of receptacles on its underside, the abrasive block assembly comprising:

a mounting block having the general shape of an elongated rectangular box and being sized and configured to be received and retained in a receptacle on the underside of a rotatable disk of a floor surface treatment apparatus, wherein the mounting block includes a plurality of downwardly facing, generally cylindrical recesses and further includes a longitudinal slot that extends along its length, through the plurality of recesses;

a first plurality of abrader assemblies, each of the first plurality of abrader assemblies being sized and configured to be received and releasably retained in a separate recess of the mounting block, and each of the first plurality of abrader assemblies including a sleeve sized to fit conformably in a separate recess of the mounting block, the sleeve having a central bore, a movable pin configured to be movable longitudinally in the sleeve bore, between a retracted position and an extended position, the movable pin incorporating an abrasive material of a first kind at its downwardly facing end, and a spring that biases the movable pin to its extended position;

a second plurality of abrader assemblies, each of the second plurality of abrader assemblies being sized and configured to be received and releasably retained in a separate recess of the mounting block, and each of the second plurality of abrader assemblies including a sleeve sized to fit conformably in a separate recess of the mounting block, the sleeve having a central bore, a movable pin configured to be movable longitudinally in the sleeve bore, between a retracted position and an extended position, the movable pin incorporating an abrasive material of a second kind, different from the abrasive material of the first kind, at its downwardly facing end, and a spring that biases the movable pin to its extended position; and a screw that spans the slot of the mounting block, such that tightening of the screw reduces the width of the slot and thereby clamps the sleeves of either the first plurality of abrader assemblies or the second plurality of abrader assemblies in their corresponding mounting block recesses.

* * * * *